(12) United States Patent
Branthomme et al.

(10) Patent No.: US 10,467,989 B2
(45) Date of Patent: Nov. 5, 2019

(54) SYSTEM FOR VISUALIZING AN AIRCRAFT PROCEDURE HAVING SEVERAL ALTERNATE SEQUENCES AND RELATED PROCESS

(71) Applicant: DASSAULT AVIATION, Paris (FR)

(72) Inventors: Arnaud Branthomme, St Remy l'Honore (FR); Gilles Constant, Le Pecq (FR)

(73) Assignee: DASSAULT AVIATION, Paris (FR)

( * ) Notice: Subject to any disclaimer, the term of this patent is extended or adjusted under 35 U.S.C. 154(b) by 575 days.

(21) Appl. No.: 15/092,838

(22) Filed: Apr. 7, 2016

(65) Prior Publication Data

US 2016/0300551 A1 Oct. 13, 2016

(30) Foreign Application Priority Data

Apr. 8, 2015 (FR) ...................................... 15 00710

(51) Int. Cl.
| | |
|---|---|
| *G09G 5/36* | (2006.01) |
| *G06F 3/0482* | (2013.01) |
| *G06F 3/0484* | (2013.01) |
| *G06F 3/0485* | (2013.01) |
| *G06T 13/80* | (2011.01) |

(52) U.S. Cl.
CPC ........... *G09G 5/363* (2013.01); *G06F 3/0482* (2013.01); *G06F 3/04847* (2013.01); *G06F 3/04855* (2013.01); *G06T 13/80* (2013.01); *G09G 2340/145* (2013.01); *G09G 2354/00* (2013.01); *G09G 2380/12* (2013.01)

(58) Field of Classification Search
None
See application file for complete search history.

(56) References Cited

U.S. PATENT DOCUMENTS

| 5,454,074 A | 9/1995 | Hartel et al. | |
|---|---|---|---|
| 2010/0161157 A1* | 6/2010 | Guilley | G05B 23/0272 701/3 |
| 2013/0031507 A1* | 1/2013 | George | G06F 3/0485 715/784 |

(Continued)

FOREIGN PATENT DOCUMENTS

FR 2956767 A1 8/2011

OTHER PUBLICATIONS

Corresponding French Search Report.

*Primary Examiner* — Toan H Vu
(74) *Attorney, Agent, or Firm* — Davidson, Davidson & Kappel, LLC

(57) ABSTRACT

A system for visualizing an aircraft procedure having several alternate sequences and related process are provided. The system includes a display and a display management assembly on the display, making it possible to display successive steps of the procedure on the display. The display management assembly able to display, on the display, an active step of an active sequence of the procedure, at least one prior step preceding the active step in the active sequence of the procedure and defining one alternative among several series of steps, and at least one step after the active step in this active sequence of the procedure, without displaying a step of the procedure situated on an inactive sequence of the procedure that may be accessible from any step before the active step.

22 Claims, 7 Drawing Sheets

(56) References Cited

U.S. PATENT DOCUMENTS

| | | | |
|---|---|---|---|
| 2014/0156115 A1* | 6/2014 | Aymeric | G06F 3/0488 |
| | | | 701/3 |
| 2015/0261379 A1* | 9/2015 | Kneuper | G08G 5/0052 |
| | | | 345/173 |
| 2016/0033987 A1* | 2/2016 | Williams | G05F 1/66 |
| | | | 235/375 |

* cited by examiner

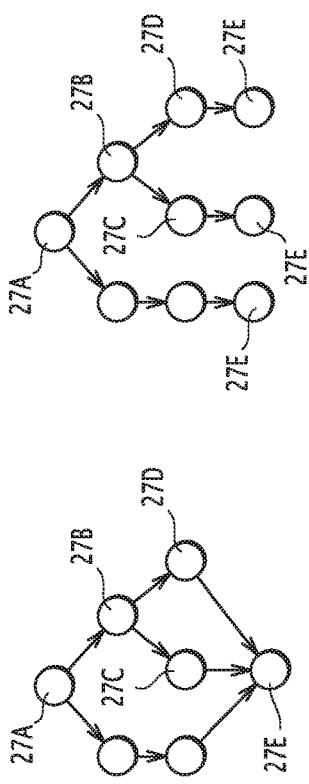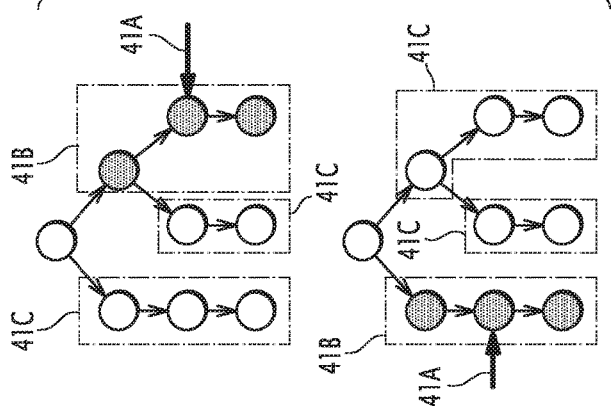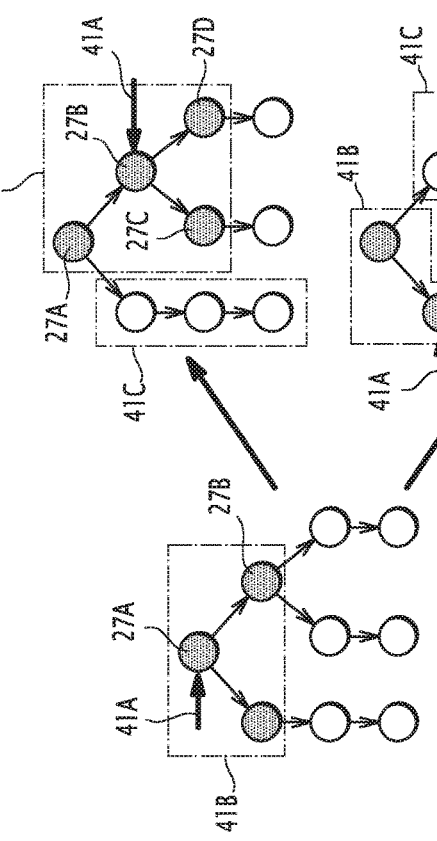

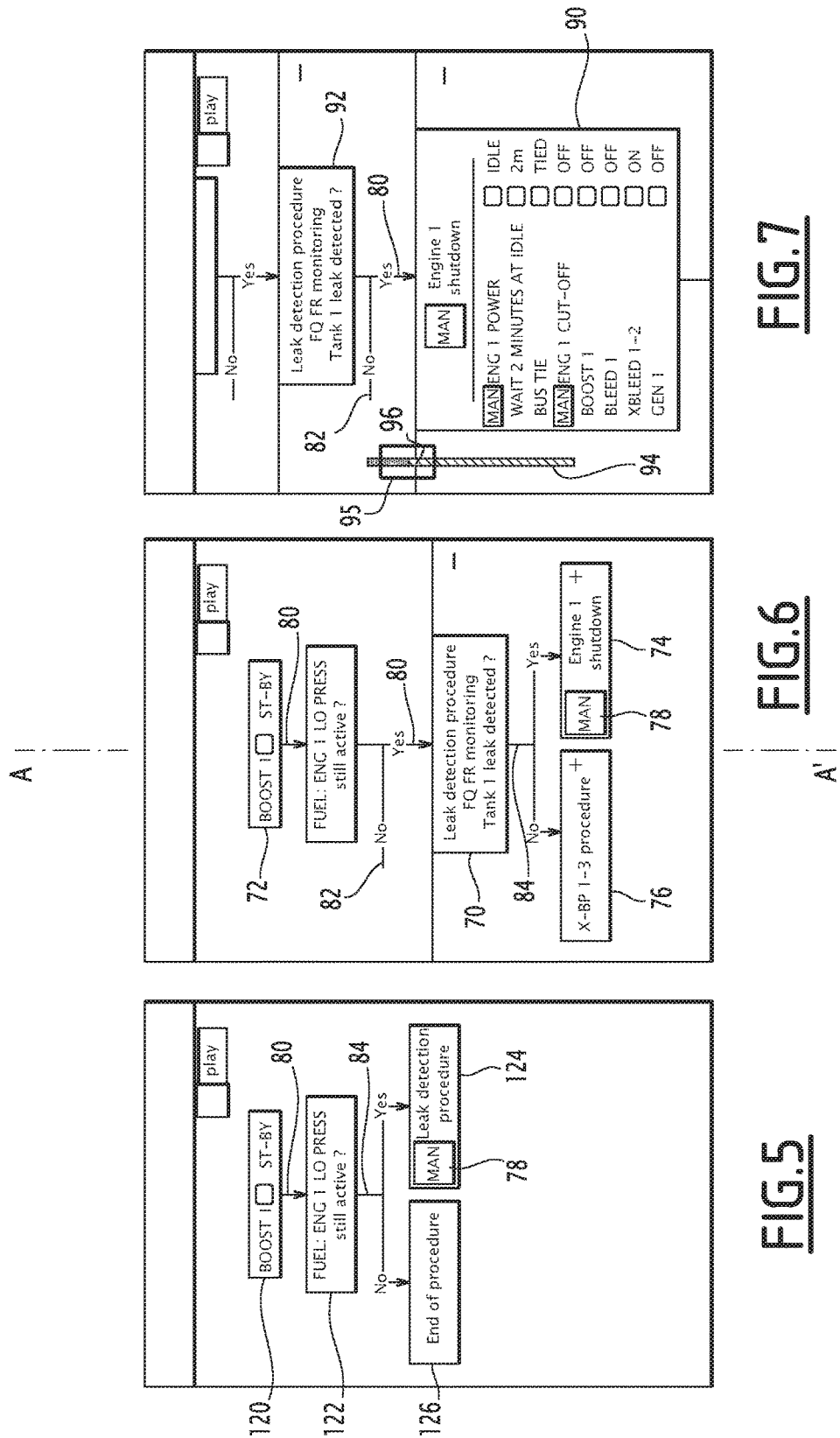

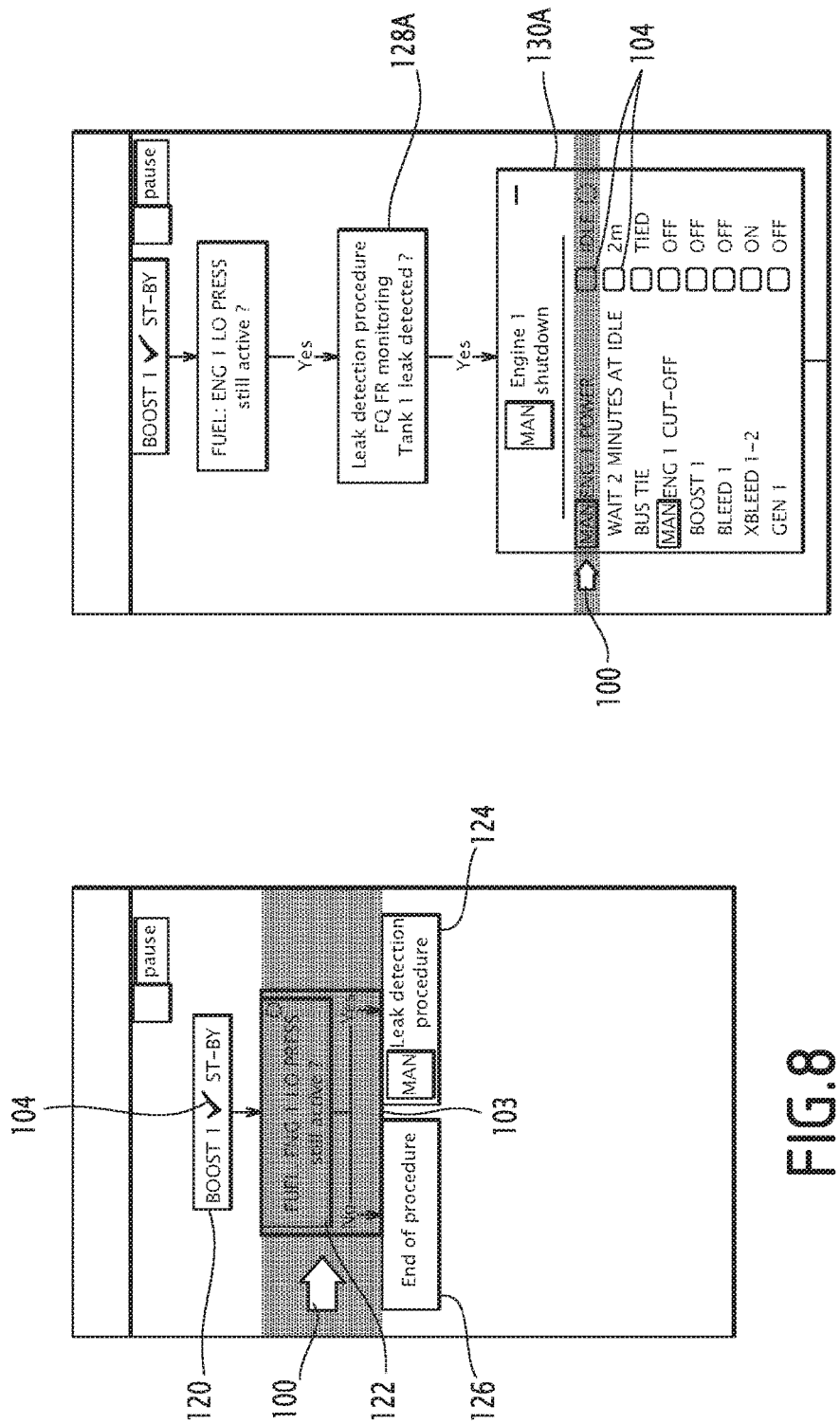

SYSTEM FOR VISUALIZING AN AIRCRAFT PROCEDURE HAVING SEVERAL ALTERNATE SEQUENCES AND RELATED PROCESS

This claims the benefit of French Patent Application FR 15 00710, filed Apr. 8, 2015 and hereby incorporated by reference herein.

The present invention relates to a system for visualizing an aircraft procedure having several alternate sequences, each step comprising at least one operation to be performed, the system comprising:
- a display;
- a display management assembly on the display, making it possible to display successive steps of the procedure on the display.

Such a system is designed to be used in a cockpit of the aircraft, in order to facilitate the work of the crew to perform required procedures over the course of the aircraft's travel. On the ground, it may also be implemented by the crew to train on procedures, or for informational purposes, for example in an electronic flight bag. It may also be implemented by a maintenance operator in the cockpit or remotely with respect to the aircraft.

The procedures are for example verification procedures to be implemented before a flight, to verify the proper working of the different systems of the aircraft, navigation procedures to be implemented during flight, for example during a change in flight phase, or failure procedures to be implemented in case of failures of one or more pieces of aircraft equipment. They are for example implemented directly in the cockpit by the crew, or remotely with respect to the aircraft by an operator on the ground Each procedure advantageously comprises a series of operations defined by the builder and/or by the operator and generally validated by the certifying authorities. These procedures are linked in the form of successive steps comprising one or more operations, or one alternative among several possible series of steps.

The operations are for example actions to be performed such as commands for an airplane system, with verification of their application, questions for the crew with a simple expected response, or requests for actions by the crew. Other operations are also purely informative, such as sending messages and/or information to the crew, with no expected response.

BACKGROUND

When the procedure is implemented during flight, the crew performs the required actions by actuating controls positioned in the cockpit, either directly by switches or by computers and software controlled by the crew.

In traditional piloting with a two-person crew, a first member of the crew handles short-term piloting and a second member of the crew successively performs various actions set out in the procedure under the oversight of the first member of the crew for significant or irreversible actions, such as an engine shutoff, fire extinguishment, etc.

The procedures are generally listed in one or more operating manuals of the aircraft, available in paper or electronic form. Many procedures are certified and must be applied strictly by the crew, in particular in case of failures.

In modern airplanes, the procedures are stored in the form of computer files in a database and can be displayed on the screen of the cockpit when they must be implemented.

Generally, the actions to be performed are displayed successively on a display, the crew having to validate the performed actions as they are carried out.

Some procedures are complex by nature and comprise several alternative sequences resulting from separate series of steps based on choices to be made by the crew, or airplane system statuses.

In this case, the user may have difficulties following the procedure and/or clearly assessing the stage of the procedure he is in.

Known viewing systems make it possible to successively display all of the steps of the procedure, but are complex to comprehend, in light of the small size of the display on which the procedure is displayed in the cockpit.

To that end, the different actions of the procedure are displayed one after the next. On a small display, in the case of one alternative among several series of steps, the user must first descend through the procedure to view all of the actions to be performed in a first series of steps, before reaching the actions to be performed for the second series of steps. This may cause him to lose time and be detrimental to his understanding of the procedure.

SUMMARY OF THE INVENTION

The known display systems are therefore not very satisfactory, and are difficult to follow for the viewing and progression of a complex procedure.

One aim of the invention is to have a viewing system that makes it possible to view and perform an airplane procedure very simply, while having good awareness of the past, present and future situation and meeting small display requirements.

To that end, a system of the aforementioned type is provided, characterized in that the display management assembly is able to display, on the display, an active step of an active sequence of the procedure, at least one prior step preceding the active step in the active sequence of the procedure and defining one alternative among several series of steps, and at least one subsequent step after the active step in the active sequence of the procedure, without displaying a step of the procedure situated on an inactive sequence of the procedure that may be accessible from any step before the active step.

The system according to the invention may comprise one or more of the following features, considered alone or according to any technically possible combination:
- each step of the procedure is chosen from among an operation to be performed, a series of operations to be performed without alternative, an access to a sub-procedure or an alternative among several series of steps;
- the display management assembly is able to display a sequence connection between each pair of successive steps displayed on the display, and, when an alternative exists in the procedure between two successive steps, a branch connection indicating an inactive sequencing of the procedure;
- the active step is able to be modified by a user and/or by an automatic performance system of the procedure, the display management assembly being able, after modification of the active step, to move the former active step onto the display to turn it into a new prior step preceding the new active step in the active sequence of the procedure, to move the former subsequent step after the former active step onto the display to turn it into a new active step and display at least one step after the new active step in the active sequence of the procedure;

the active step, the subsequent step and the prior step are displayed along an axis, advantageously vertical, on the display, the display management assembly being able to move the former active step and the former subsequent step along the axis, after modifying the active step;

the active step is an alternative between two sequences of steps, the modification of the active step consisting of selecting one step from among the two series of steps, the display management assembly being able, after modification of the active step, to display an alternative connection between the series of steps, and after modification of the active step, to display at least the chosen step, and to hide the step not chosen;

the display management assembly is able to display the chosen step by enlarging the chosen step, and is able to hide the step not chosen by moving the step not chosen off of the display;

the modification of the active step is obtained by validating the performance of that step during the performance of the procedure, the display management assembly being able to display a validation button for the active step, able to be actuated by a user to validate the active step;

the validation button is able to be activated by selecting and moving the button on the display, by the user, along a predetermined trajectory;

the display management assembly is able to display a scroll bar able to be actuated to view, on the display, steps before the active step in the active sequence;

the scroll bar includes an indicator of the degree of progress of the procedure in the active sequence of the procedure;

at least one step of the procedure able to be displayed on the display includes a plurality of operations to be scrolled through with no branch, the display management assembly being able to display the details of the successive operations to be done in the step;

the display management assembly is able to display, during a performance of at least one operation of the procedure, a signal cursor for the operation being carried out, and an indicator showing the performance of each operation to be carried out;

the display management assembly is able to display an activation button for the performance of the procedure, that can be activated by the user to go from an activation configuration of the performance of the procedure, preventing consultation of the steps after the procedure, to a paused configuration of the performance of the procedure, allowing the consultation of the subsequent steps of the procedure.

The invention also provides to a method for visualizing an aircraft procedure including alternative sequences of successive steps, each step comprising at least one operation to be performed, the method comprising the following steps:

providing a viewing system as defined above;

simultaneously displaying, on the display by the display management system, an active step of an active sequence of the procedure, at least one prior step before the active step in the active sequence of the procedure, the prior step defining an alternative between several sequences of steps and at least one subsequent step after the active step in this active sequence of the procedure, without displaying a step of the procedure situated on an inactive sequence of the procedure that may be accessible from any step before the active step.

BRIEF SUMMARY OF THE DRAWINGS

The invention will be better understood upon reading the following description, provided solely as an example and done in reference to the appended drawings, in which:

FIG. 1 is a block diagram view showing one possible example sequence of a procedure designed to be viewed using a viewing system according to an embodiment of the invention;

FIG. 2 is a view similar to FIG. 1, after expanding the various sequences;

FIG. 4 is a diagram illustrating the principle of the display of the procedures using the viewing system according to an embodiment of the invention;

FIGS. 5 to 7 are views illustrating the display on the display of the system of FIG. 3, during a use of the system according to an embodiment of the invention in consultation mode for a procedure;

FIGS. 8 to 12 are views illustrating the display on the display of the system of FIG. 3, during a use of the system according to an embodiment of the invention in performance mode for a procedure;

DETAILED DESCRIPTION

Figure 3:
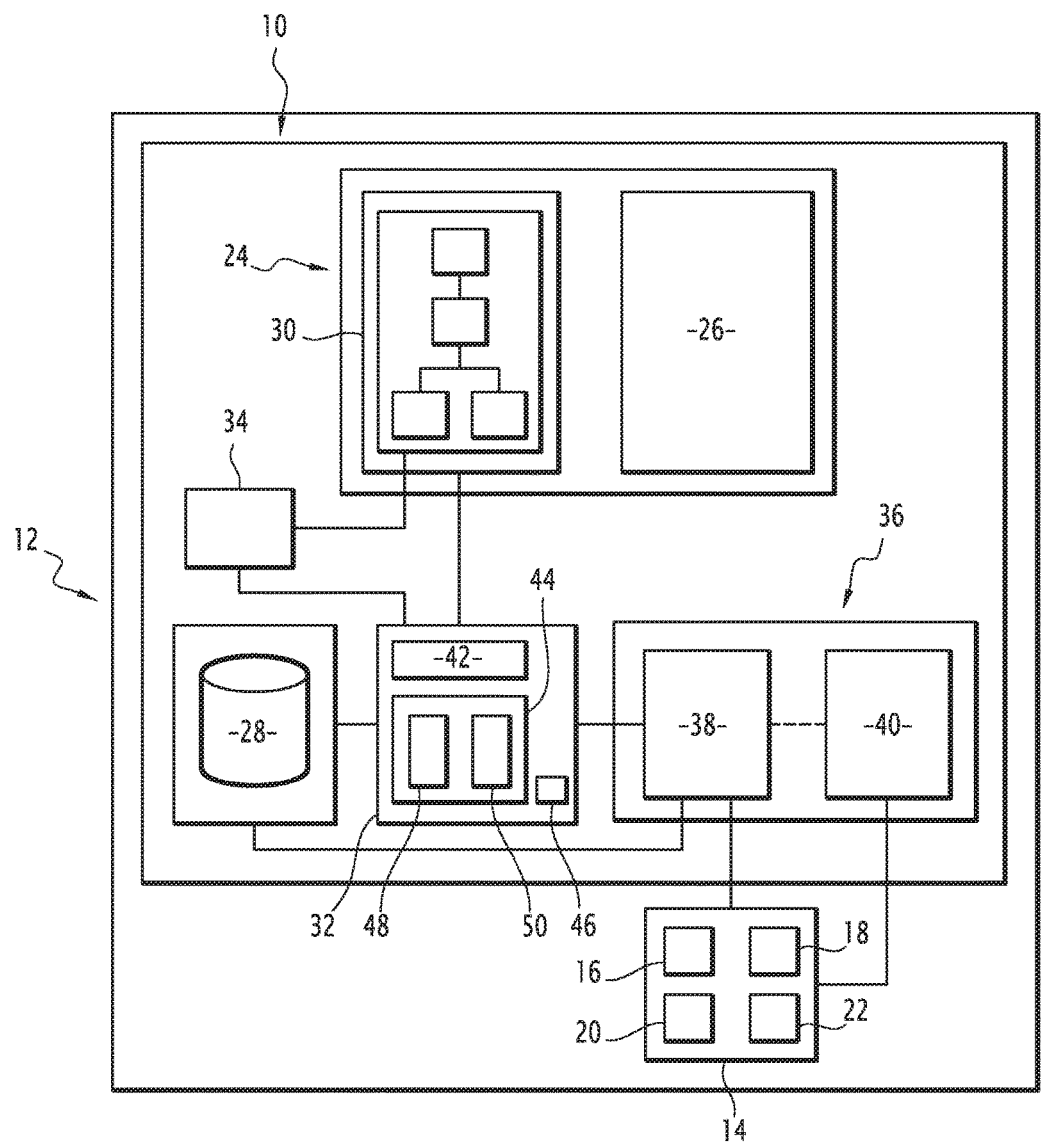
FIG. 3 is a block diagram showing a first viewing system according to an embodiment of the invention.

A first system 10 for viewing a procedure of an aircraft 12 according to an embodiment of the invention is diagrammatically illustrated by FIG. 3.

The system 10 is intended to help the crew implement procedures comprising alternative sequences of steps to be performed relative to systems 14 of the aircraft 12. Each step comprises at least one operation to be performed.

The systems 14 for example comprise one or more hydraulic systems 16, one or more electrical systems 18, one or more propulsion systems 20 of the aircraft 12 and/or one or more conditioning systems 22 of the cabin. This list may extend to all controlled systems of an aircraft.

Each system 14 includes equipment and components able to perform hydraulic, electric, propulsion, or conditioning functions of the aircraft 12.

Traditionally, the aircraft 12 includes a cockpit 24 occupied by the crew of the aircraft 12. The cockpit 24 includes at least one board provided with physical control elements and/or a control screen 26 of the systems 14 of the aircraft 12, able to implement commands from the systems 14, by means of physical or software switches actuated by the crew, or by means of computers and software controlled by the crew.

A procedure is made up of sequences of operations intended to be performed by the crew of the aircraft 12 in particular as a function of the given operating statuses of the systems 14 of the aircraft 12.

Each procedure is for example implemented upon the occurrence of a particular travel phase of the aircraft 12, for example taxi, takeoff, passage past a given altitude, entry into cruising mode.

Other procedures are implemented upon the occurrence of a malfunction or failure of a system 14 of the aircraft 12.

In this case, the procedure generally corresponds to a configuration or reconfiguration of one or more pieces of equipment of one or more functional systems 14 of the aircraft 12, by performing operations or a sequence of operations, depending on the observed operating statuses of the systems 14 of the aircraft 12.

The operations to be performed advantageously comprise actions to be performed, such as an analysis of a status of a piece of equipment, a command intended for an airplane system, with confirmation of the performance of the command, a question for the crew, a request for action from the crew, monitoring of actions by the crew, a choice from among several possible operations, a bypass of an optional operation, a manual action or an action having failed to be performed automatically in an allotted time frame, the addition of a new procedure to the list of procedures to be played out, the initiation of a procedure and a validation by the user that a piece of information has been acquired. Certain operations of the procedure are informative without validation by the user, such as informational displays for the crew, for example sending an informational message to the crew or displaying one or more parameters relative to the procedure.

A command is intended to be sent to an airplane system. Examples of commands are the opening or closing of a valve, the control of electric switches, etc.

A command is generally followed in the procedure by a verification of its application.

A question to the crew is generally followed by waiting for simple response, for example "yes" or "no".

A request for action by the crew is generally followed by waiting for the action, measured through the effects of the action owing to the sensors of the systems 14 of the aircraft 12.

Pilot action monitoring is sometimes followed by a confirmation when that action may have significant consequences for the conduct of the flight.

The choice among several possible operations, or "alternatives", is determined as a function of the value of information representative of operating statuses of the systems 14 of the aircraft 12, for example the status of a valve, observed electrical voltages, the presence of a failure message or a choice by the pilot.

The choice is reflected by a transition to a series of operations chosen from among several possible series of operations provided in the procedure, generally between two possible series of operations, based on current operating statuses of the aircraft, i.e., operating statuses that have just been measured and/or pilot choices.

A simple display for the crew is sometimes purely informational. In that case, it is not followed by any action.

The actions are to be performed on a control table or a screen diagram. The performance of the action is validated by manual acknowledgement or is detected automatically by a supervision module.

In reference to FIG. 1, the procedures are generally specified by outlining the successive list of steps 27A to 27E of the procedure, to perform at least one sequence of steps, each step 27A to 27E comprising at least one operation to be performed.

As previously indicated, the procedure includes at least one step 27B forming an alternative leading to different series of steps 27C, 27D, as a function of current operating statuses of the systems 14 of the aircraft 12, or responses by the crew to the questions asked to the crew.

More generally, each step 27A to 27E of the procedure is formed by a single operation, by a series of operations without alternatives forming a macro-operation, by an alternative leading to two different series of steps, and/or by access to a sub-procedure contained in the procedure.

In reference to FIG. 3, the viewing system 10 includes a database of procedures 28, receiving the specifications for a plurality of procedures intended to be performed by the crew as a function of given operating statuses of the systems 14 of the aircraft 12, a display 30 advantageously intended to be placed in the cockpit 24 of the aircraft to be accessible to the crew, a display management assembly 32 on the display 30, able to display chosen successive steps of the procedure on the display 30, and a man-machine interface 34 able to control the display and/or validate the operations present in the successive steps of the procedure.

The man-machine interface 34 for example comprises a touchscreen of the display 30 and/or a keyboard and a selection member on the display 30, such as a cursor control or a mouse.

Advantageously, the viewing system 10 is connected to an assistance system 36 for the crew including a supervision module 38, able to automatically validate the performance of operations of the steps of the procedure, and optionally an automatic performance module 40 for operations of certain steps of the procedure.

The database of procedures 28 contains a description of the procedures, in the form of characteristics of each of the operations that it contains, organized by successive steps, and the successive performance order of each of the operations, within each step, and from step to step.

For procedures including alternatives toward other, different series of steps, it further comprises the definition of the operating statuses or user choices conditioning the passage to one or the other of the series of steps.

The display 30 is for example a screen of the control table 26 or a window on the screen of the control table 26.

It has limited dimensions, for example a maximum dimension, taken between the furthest two points of its periphery, smaller than 35 cm.

The display 30 typically has a height comprised between 4 cm and 30 cm and a width comprised between 4 cm and 30 cm.

The display management assembly 32 is able to create the display presented on the display 30, and to control the display 30 so that it shows that display in whole or in part.

As will be seen below, the display management assembly 32 is able to operate in a consultation mode, in which the user views the procedure for informational purposes on the display 30, without carrying out the operations of the different steps of the procedure.

The display management assembly 32 is also able to operate in an operation performance mode, in which the user and/or the control module 40 carries out at least part of the operations of the steps of the procedure, the user and/or the supervision module 38 validating the performance of each operation.

According to an embodiment of the invention, the display management assembly 32 is able to simultaneously display, on the display 30, an active step in an active sequence of the procedure, at least one prior step preceding the active step in the active sequence of the procedure, and at least one subsequent step after the active step in the active sequence of the procedure, without displaying a step of the procedure situated on an inactive sequence of the procedure accessible from a step before the active step.

This is illustrated by FIG. 4, in which the active step is indicated by an arrow 41A and in which the active sequence 41B is defined by a closed line.

In the consultation mode, the active step indicated by the arrow 41A is a step selected by the user on the display 30 using the man-machine interface 34, for example by clicking on the step or by touching the display 30 in the location of the step.

In the operation performance mode, the active step indicated by the arrow 41A is generally the step of the procedure currently being played out, in which an operation is in progress, before validation of the performance of the step.

The active sequence 41B is made up of the successive active steps selected by the user or performed during the performance of the procedure, as well as the step or series of steps immediately following the active step.

An inactive sequence 41C of the procedure, accessible from a step before the active step, visible in mixed lines in FIG. 4, groups together the steps of a sequence of steps accessible from a step before the active step, but not selected by the user in consultation mode or not played out in performance mode.

In reference to FIG. 1, the display management assembly 32 includes at least one processor 42 and a memory 44 including a plurality of software modules able to be executed by the processor 42. It further includes a graphic interface management device 46, connected to the display 30. The processor 42 and the memory 44 are configured to be used in the aeronautics field.

The memory 44 contains at least one data recovery and processing module 48, able to query the database 28 to recover and process the data from at least one procedure chosen by the user, and a development module 50 developing the display on the display 30, able to create the display and send it to the display 30 via the graphic interface management device 46.

The data recovery and processing module 48 is able to load, from the database 28, the characteristics of the successive steps of the procedure, in particular the operation(s) to be performed in each step and the connections between the steps.

The characteristics of the steps for example include characteristic information of the step, for example the title of the step, the statement to be made, an operation or the definition of an alternative. The characteristics optionally include additional information from the open world, i.e., outside certification constraints, and if necessary, information relative to whether the performance of an operation by the crew is mandatory.

When a step includes a series of operations, the characteristics of the steps include the list of operations to be performed and the sequence of the operations.

The recovery and processing module 48 is able to expand the procedure by duplicating, from each alternative of the procedure, the steps 27E shared by the different series of steps of the procedure to separate the different branches of the procedure, as illustrated in FIG. 2.

The development module 50 is able to create a display for example visible in FIG. 6, and comprising the active step 70 in the active sequence of the procedure, at least one prior step 72 before the active step and at least one subsequent step 74, 76 after the active step 70.

The steps 70 to 76 are each displayed in the form of a box containing the title of the step, and optionally, an icon 78 representative of the obligation to perform the step by the crew.

In order to maximize legibility, steps 70 to 76 are displayed by order of performance along an axis A-A' that is vertical in FIG. 6. Thus, each prior step 72 is displayed above the active step 70 and the subsequent steps 74, 76 are displayed below the active step 70.

The active step 70 here being an alternative, the steps 74, 76 that are possible series of steps at the active step 70 are displayed below the active step 70, while advantageously being positioned next to one another.

Alternatively, the performance order is done along a horizontal axis.

The development module 50 is able to hide the steps of inactive sequences, accessible from each prior step 72 before the active step 70 to facilitate the comprehension of the active sequence by the user.

The development module 50 is able to place, on the display that it creates, sequence connections 80 between the steps, characterizing the sequencing direction of the steps.

Furthermore, according to an embodiment of the invention, and in consultation mode, the development module 50 is able to place, on the display that it creates, a branch connection 82 indicating a sequence of inactive steps not accessible from a prior step 72, without displaying the steps along that branch connection 82 in the inactive sequence.

The branch connection 82 is advantageously tapped on the sequence connection 80 connecting the prior step 72 to the active step 70.

The development module 50 is able to indicate, on the sequence connection 80 and the branch connection 82, a conditional indication representative of the choice condition of the corresponding series of steps in the alternative.

In FIG. 6, the conditional indication is for example "yes" or "no" in response to the alternative defined in the prior step 72 ("FUEL: ENG1 LO PRESS still active?").

Likewise, when the active step 70 is an alternative, the development module 50 is able to place an alternative connection 84 between the active step 70 and each of the possible series of steps 74, 76, with the conditional indication associated with each series of steps 74, 76.

The active step 70 is able to be modified. In the consultation mode, the active step 70 is for example modified when the user selects a new active step, for example the following step 74 in FIG. 6, using the man-machine interface 34.

In the performance part of the procedure, the active step is modified when the active step 70 is validated or acknowledged by the user or by the supervision module 38 to go on to step 74.

When the active step 70 is modified, for example by selection of or passage to step 74 shown in FIG. 6, the development module 50 is able to create an animation that moves, on the display, the former active step 70 to turn it into a new prior step 92 visible in FIG. 7 and to position the new active step 90 resulting from step 74 in FIG. 6 under the new prior step 92.

The former active step 70 being an alternative making it possible to choose two different series of steps 74, 76, the development module 50 is able to hide the non-selected step 76 visible in FIG. 6 and display, in FIG. 7, a branch connection 82, tapped on the sequence connection 80 between the active step 90 and the prior step 92.

The development module 50 is able to create an animation between the display before modification shown in FIG. 6 and the modified display shown in FIG. 7, in which the former active step 70 and the prior step 72 are translated along the axis A-A', advantageously upward, and in which the chosen step 74 becomes larger and moves toward the axis A-A', whereas the non-chosen step 76 moves transversely to disappear from the display.

Advantageously, when the new active step 90 is displayed, the module 50 is able to allow the simultaneous display of all of the steps after the active step 90 until the next step forming an alternative and the series of steps possible after the alternative.

Thus, the user has an improved view of the past, present and future situation, while retaining adequate legibility, even on a small display.

Advantageously, the development module 50 is able to create a display in which all of the prior steps 72 from the point of entry into the procedure to an active step 70 forming an alternative can be accessible.

If the number of steps is too large to be displayed in full on the display 30, the development module 50 is able to insert, on the display, a scroll bar 94 visible in FIG. 7 allowing navigation along the movement axis A-A'.

The development module 50 is able to calculate and display, on the scroll bar 94, an icon 95 for localization of the steps displayed on the screen, and an indicator 96 of the degree of progress of the active step in the active sequence of the procedure, from the beginning of the procedure to the end of the procedure, by choosing one possible sequence of events, for example the longest possible sequence until the end of the procedure and including the active sequence.

The icon 95 is for example a closed curve defining the displayed steps on the scroll bar 94.

The indicator 96 here is formed by a gauge positioned in the scroll bar. The level of the gauge embodies the prior steps before the active step situated above the level of the gauge (for example displayed in a first color) and the subsequent steps after the active step situated below the gauge level (for example in a second color).

The indicator 96 allows the user to move quickly to view the prior and/or subsequent steps, then to return to the active step by looking at the gauge level.

In an alternative, text is displayed to give the number of steps remaining to be performed and the longest possible sequence of the procedure.

The position of the indicator 96 on the scroll bar 94, here the level of the gauge, is represented for the degree of progress, which allows the user to approximately situate the step in the sequence of the procedure.

In consultation mode, the visualization is recursive. The user can go up the active sequence of the procedure and select an unexplored series of steps.

To that end, starting from the new active step 90 in the display of FIG. 7, the user is able to select the step 92 corresponding to the former active step 70, to return to the display of FIG. 6, then select step 76 instead of step 74.

In this case, the development module 50 is able to deploy step 76 and hide step 74.

More generally, the development module 50 is able to deploy the box of a new active step to display, in the box of the active step, the list of operations to be performed in that step. It is able to condense the box upon an action by the user, or when the active step is modified, so as only to display the title of the step in the box.

In the performance mode, illustrated by FIGS. 8 to 12, the development module 50 is able to place a cursor 100 on the display, said cursor identifying the operation in progress in the active step.

Figure 10:
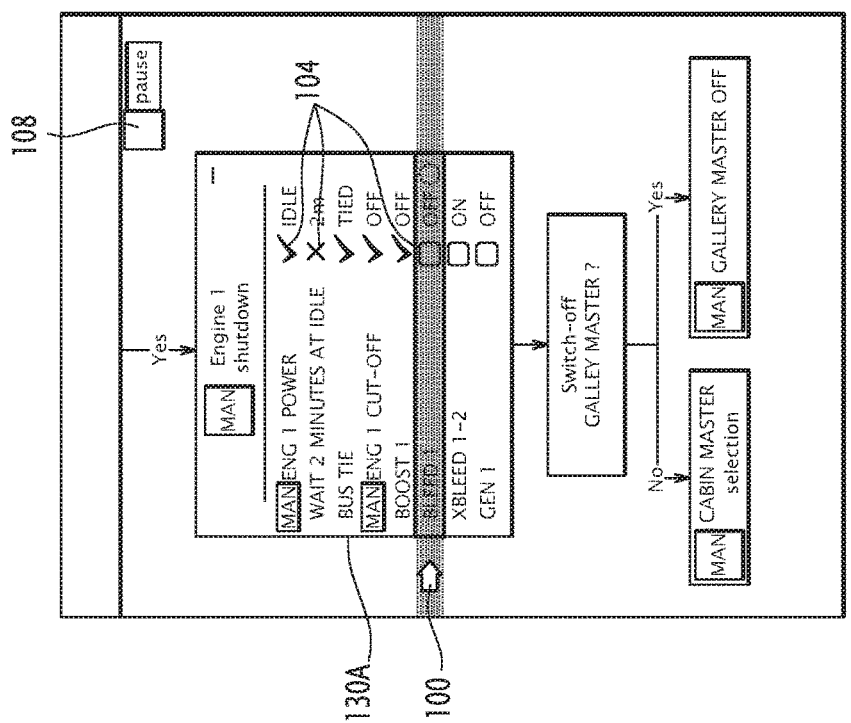

A cursor 100 is able to show a first normal display configuration, in the event no interaction with the user is necessary, as illustrated in FIG. 10. It is able to show a second marked display configuration, visible in FIG. 11, if a user interaction is expected. In the latter case, the cursor 100 advantageously has a different color, and/or a visual effect such as blinking or a cyclical size increase/decrease making it possible to view it quickly. This blinking may be temporary.

The display of a cursor 100 in the latter case may also be combined with that of a user interaction button 102, able to be displayed in the active step and/or the operation in progress of the step, and making it possible to validate the operation and/or to choose an alternative, and optionally with an outside box 103.

The interaction button 102 can for example be activated by selecting, then dragging a finger of the user along a given trajectory on the display 30, for example in horizontal translation, when the man-machine interface 34 comprises a touchscreen or by clicking using a cursor moved by a selection member of the man-machine interface 34.

The selection of the button 102, then the dragging along a given path prevents validation of the operation from being done erroneously by the user, by simply touching the screen.

In the performance mode, for each operation to be performed, the development module 50 is able to provide a visual indication of the performance level of the operation, for example using a color code, and/or to display a performance level symbol 104 of the operation.

The performance level of the operation is for example chosen from among an operation that must be performed (the symbol 104 is then an empty square in FIG. 10), a performed and validated operation (the symbol 104 is then a checkmark symbol in FIG. 10, and the operation is colored green), an operation in progress (the symbol 104 is then a clock, not shown), and an operation not performed due to a failure in the performance (the symbol 104 is then an X and the operation is colored amber).

In the case of an operation in progress requiring the performance in a predefined performance time frame, a countdown timer before the end of the predefined performance time frame is advantageously displayed.

A prior step comprising fully performed operations is also colored green, while a step comprising at least one operation not performed is colored amber.

In the procedure performance mode, the development module 50 is also able to display an activation/deactivation button 108 for the performance of the procedure.

The button 108 can be activated in the same way as the interaction button 102.

Figure 11:
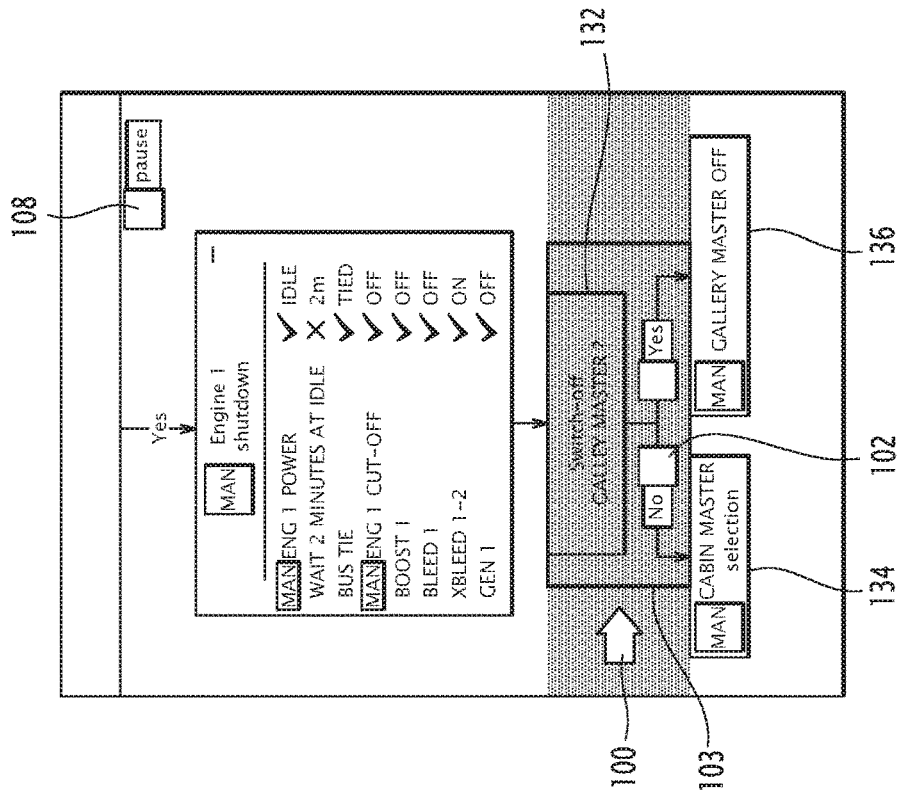
Figure 12:
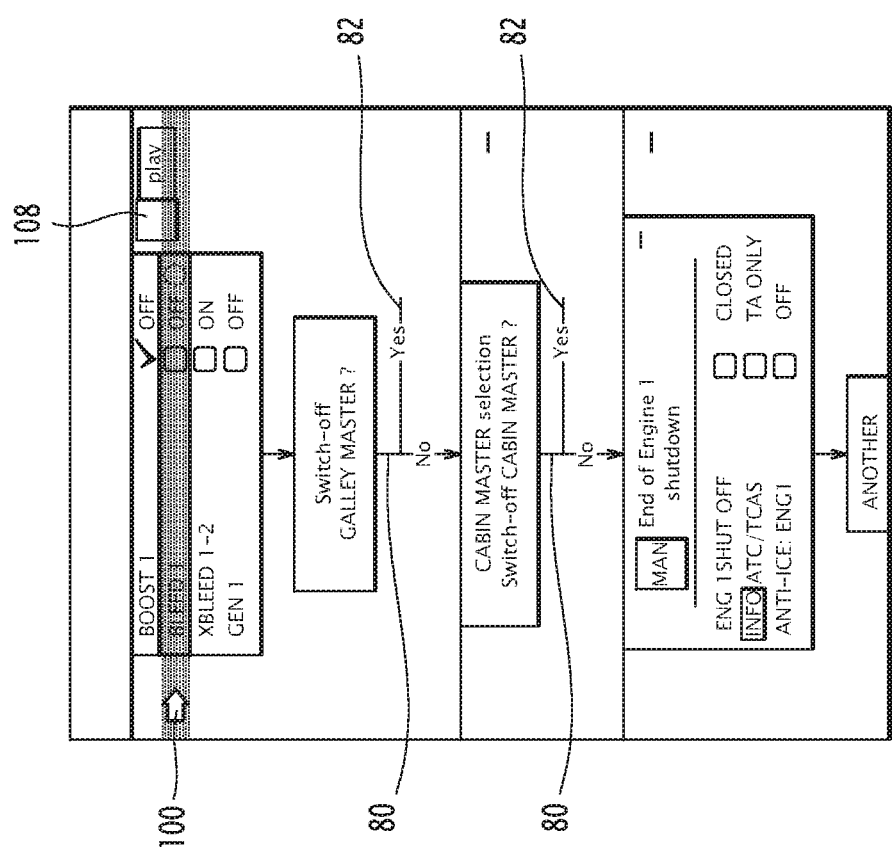

It is able to switch the display management assembly 32 between an active performance configuration of the procedure, shown in FIG. 10 or FIG. 11, and a paused configuration, shown in FIG. 12.

In the paused configuration, or when a stopping point in the active performance configuration requiring validation from the user is reached, the user is able to navigate in the steps 74, 76 of the procedure subsequent to the active step 70. In this case, the development module 50 works for these subsequent steps as in the consultation mode, as shown in FIG. 12.

The user can also go back up the active sequence to consult the prior steps of the procedure already performed. He is, however, unable to view the inactive sequences of the procedure accessible from the prior steps 72.

The development module 50 displays the connections 80 between the steps, without displaying the branch connections 82 from the steps 72 prior to the active step 70, as shown in FIG. 9.

As previously shown in the consultation mode, the development module 50 is able to insert a scroll bar 94 in the display provided with a progress level indicator 96 as described above.

The supervision module 38 is connected to the airplane systems 14 to detect system statuses and the performance of at least one operation.

The automatic performance module 40 is connected to the airplane systems 14 to send automatic performance commands for least one operation, optionally after confirming performance by a user of the system.

A first viewing method implementing a viewing system 10 according to an embodiment of the invention during the consultation of a procedure by a user will now be described, in light of FIGS. 5 to 7.

Initially, the user selects the procedure he wishes to view. The loading and processing module 48 queries the database 28 to recover the data of the procedure described above, in particular the characteristics of the successive steps of the procedure, operations to be performed within each step and the connections between the steps.

Optionally, the module 48 expands the procedure as illustrated in FIG. 2 by duplicating, at each branch of the procedure, the steps shared by other branches.

Next, as illustrated by FIG. 5, the module 48 generates a display having an initial step 120, an active step 122 forming an alternative, and two possible series of steps 124, 126 from the alternative that is displayed on the display 30.

Each step 122 to 126 is shown in the form of a box here comprising the name of the step, and optionally an icon 78 indicating the obligation for the pilot to perform the step.

Likewise, the development module 50 creates the display of a simple connection 80 between the initial step 120 and the active step 122 and an alternative connection 84 between the active step 122 and each of the series of steps 124, 126.

When the user wishes to view a first series of steps, he modifies the active step by selecting the step 124, by contact with the touchscreen, or by clicking using a selection member.

In this case, as illustrated in FIG. 6, step 124 of FIG. 5 becomes the new active step 70 and the former active step 122 of FIG. 5 becomes a prior step 72.

According to an embodiment of the invention, the development module 50 creates an animation that moves the step 124 to center it, increasing the size of its box. The animation hides the alternative step 126 by moving the step 126 sideways to cause it to gradually leave the display.

The development module 50 places a sequence connection 80 between the active step 70 and the prior step 72 and a branch connection 82 tapped on the sequence connection 80, to embody the presence of an inactive sequence accessible from the prior step 72 toward the series of steps 126. This inactive sequence is hidden on the display 30.

The active step 70 of FIG. 6 is also an alternative. The development module 50 displays the two subsequent series of step 74, 76 that are possible and an alternative connection 84 between the active step 70 and the series of steps 74, 76.

In this case, the subsequent step 76 is a sub-procedure. The subsequent step 74 is a series of operations that must be performed by the pilot, as embodied by the symbol 78.

When the user wishes to continue consulting the procedure, he for example selects step 74.

A new active step 90 is then obtained from the former subsequent step 74 by deploying the box of the step 74 and displaying the series of operations that must be performed in this new active step 90.

The former active step 70 becomes a new prior step 92 in FIG. 7 and moves upward along the axis A-A'.

As before, the former subsequent step 76 that is not selected is hidden, as well as all of the steps following that step 76, which are in an inactive sequence.

A sequence connection 80 is created between the new prior step 92 and the new active step 90, and a branch connection 82 is tapped on the direct connection 80.

All of the prior steps before the active step 90 from the starting point remain present on the display created by the module 48. However, in light of the size of the display 30, only part of the subsequent steps is visible on the display 30. The steps of the active sequence that are not visible remain accessible using a scroll bar 94 having a progress indicator 96 as described above.

If the user wishes to examine the steps of an inactive sequence accessible from a prior step 92, he compresses the box of the active step 90, which again modifies the active step. He then returns to the configuration of FIG. 6, in which the active step is step 70.

This then allows him to view step 76, as previously described.

It is also possible to select a branch connection 82 to show the sequence of steps associated with this connection 82, which become part of the active sequence, by hiding the inactive sequences accessible from prior steps.

A second viewing method implementing a viewing system 10 according to an embodiment of the invention, during the performance of a procedure, will now be described, in reference to FIGS. 8 to 12.

In this example, the procedure is performed automatically by the control module 40, with the potential obtainment of confirmation from the user for certain operations, in particular for certain alternatives. The performance of the operations done is validated automatically by the supervision module 38.

Initially, the user activates the beginning of the procedure using the man-machine interface 34, for example by clicking on the button 108 and/or moving along a determined trajectory on the touchscreen. The button 108 is then displayed by the development module 50 with a performance symbol.

The development module 50 then creates a display as illustrated in FIG. 8, comprising the startup step 120 for the procedure, the subsequent step 122 after the startup procedure 120, and the two alternative series of actions 124, 126 following step 122.

The control module 40 then launches the automatic performance of the operation present in the active step.

Initially, before performance of the operation, the performance level symbol 104 is an empty square visible in FIG. 8. The performance level symbol 104 successively goes from a clock during performance of the operation to a checkmark after performance of the operation and validation of the performance of the operation by the supervision module 38.

Likewise, the development module 50 changes the color of the operation based on the performance level, for example turning it cyan during performance and green once the operation has been performed.

Likewise at the same time, the development module 50 displays a cursor 100 next to the operation in progress in the first normal display configuration.

Once the initial step is validated, the active step is modified as illustrated by FIG. 8. The cursor 100 is moved next to the new active step 122 and the former active step 120 becomes a prior step.

The new active step 122 being an alternative requiring a choice, the development module 50 takes the cursor 100 into the second marked display configuration, and places the box 103 around the active step.

The control module 40 automatically chooses a series of steps as a function of system statuses, here the "Leak detection procedure" series of steps.

The development module 50 once again modifies the displayed active step as illustrated in FIG. 9. It turns the former active step 122 into a prior step 128A, performs an animation hiding the series of steps 126 not selected and creates a connection 80 between the new prior step 128A and the new active step 130.

According to an embodiment of the invention, no step of the procedure situated on an inactive sequence of the procedure accessible from a prior step 128A before the active step is displayed.

However, unlike the consultation mode, the performance of the procedure is irreversible, except in case of explicit cancellation by the pilot of each step by going back up in the procedure. The development module 50 therefore does not display a branch connection 82 on the connecting connections 80 between the prior steps before the active step, but only a conditional indication representative of the choice made (here "yes" in response to the question of the alternative), as shown in FIG. 9.

The development module 50 also expands the active step 130A to successively display all of the operations to be performed during this step. Each operation of the procedure is accompanied by a performance level symbol 104 as previously described.

The control module 40 then performs the operations to be performed as previously described and the development module 50 modifies the display of the operation accordingly.

When an operation can be bypassed manually, the development module 50 places a bypass button on the operation, allowing the user to go to the following operation by clicking on the button or moving the button on the screen.

Once the series of operations of the active step 130A is performed, the supervision module 38 validates the step, which allows the passage to a new active step 132 forming an alternative, shown in FIG. 11.

The user must manually choose the series of steps 134, 136 to be implemented. The development module 50 then displays a box around the active step 132 and two selection buttons 102 able to be actuated in a first direction to choose a first series of steps and a second direction to choose a second series of steps. The cursor 100 is placed in its marked display configuration.

The performance of the procedure being suspended at the user's choice, the latter may then actuate the button 108 to deactivate the performance of the procedure and consult the subsequent steps of the procedure without performing the operations of those steps.

For example, the user selects a series of steps 134, among the two possible series of steps 134, 136 after the active step 132.

The development module 50 modifies the active step 132, and hides the series of steps 136 not selected, as previously described for the consultation mode. In reference to FIG. 12, it places a connection 80 between the active step and the prior step and a branch connection 82.

The user can also navigate on the active sequence of steps by using the scroll bar 94, while being guided in his progression by the progress degree indicator 96.

Figure 13:
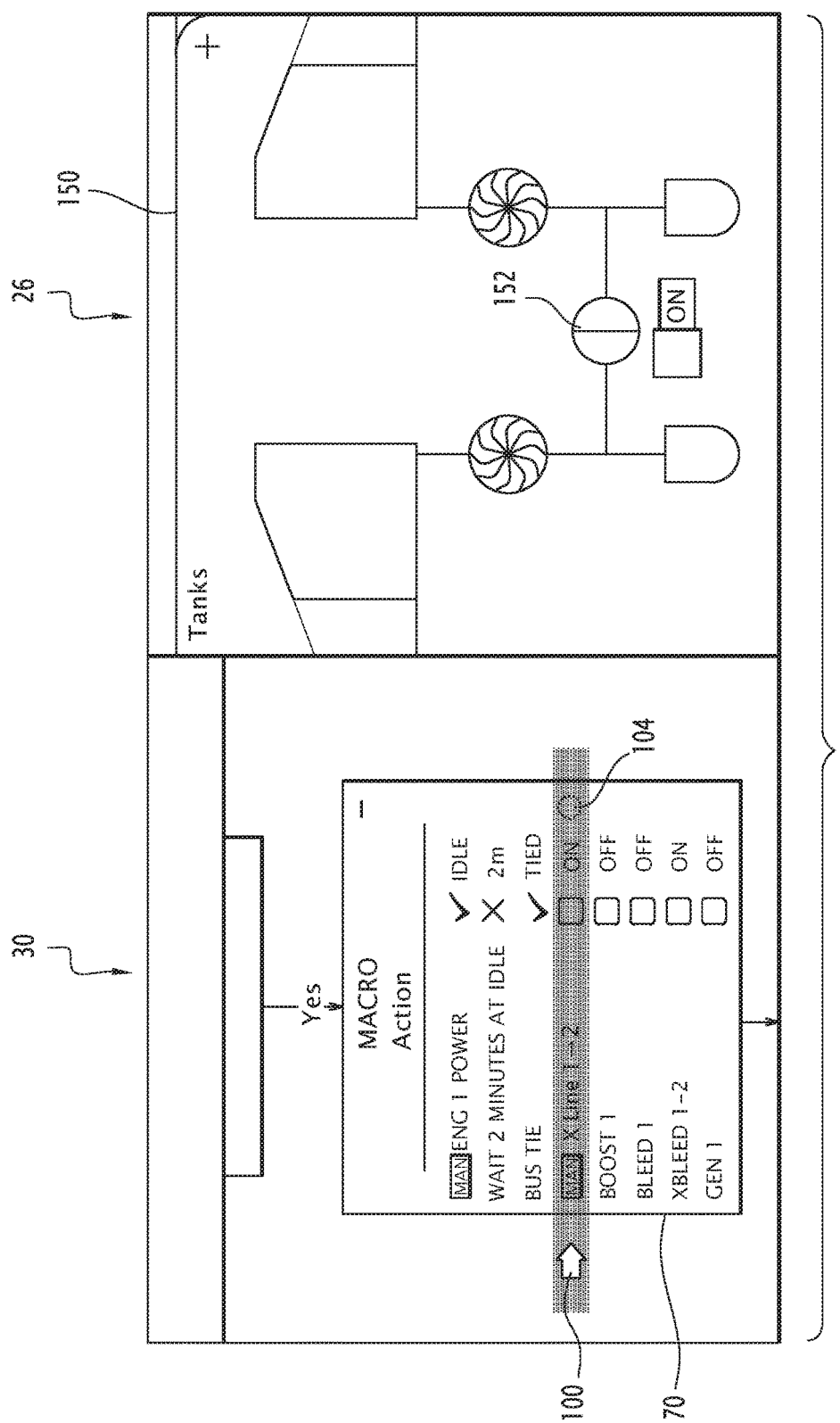
FIG. 13 is a view illustrating the display on a display of the system of FIG. 3 during the implementation of a manual action by the user, and in parallel, the corresponding display on a display of a management assembly of the airplane systems, illustrating the control associated with the action to be carried out.

In an alternative illustrated by FIG. 13, when the user must manually perform an operation of the active step on a piece of equipment of a particular system 14 of the aircraft 12, the control screen 150 of that system 14 is activated and an indicator 152 is placed on the block diagram of the system 14 of the aircraft 12 to indicate the operation to be performed.

In another alternative of the performance mode, the user partially or completely manually performs the operations of the successive steps of the procedure without using the control module 40 and/or manually validates the performance of each operation, without using the supervision module 38.

In still another alternative, the system 10 has no supervision module 38 and/or control module 40.

In still another alternative, the user is able to select a specific icon in the box of the active step of the procedure, to show a window containing the information from the open world.

Owing to the system 10 according to an embodiment of the invention, a user having to perform complex procedures is able to navigate more easily in the performance of the procedure to follow an active sequence, without being disrupted by prior inactive sequences, which are nevertheless marked by a branch connection 82 in consultation mode.

The presentation of the subsequent steps in the form of alternatives allows the user easy viewing of the possible series of steps after the active step.

In consultation mode, the user is able to go down in the procedure, and on the contrary go up in the active sequence and return to preceding alternatives, to potentially explore other possible sequences. The use of a scroll bar 94 provided with a progress level indicator 96 further facilitates the perception of the progress of the active step of the procedure.

The user therefore has better awareness of the past, present and future situation.

The viewing system 10 according to an embodiment of the invention is also very useful in a performance mode of the procedure, in particular when this performance is automatic, which makes it possible to easily locate the step of the procedure being played out. The performance mode is irreversible for the past steps, but allows consultation of the future steps.

In particular owing to the successive hiding of the series of steps not chosen for the alternatives, the display remains both compact and legible, which meets the technical constraints of an aircraft cockpit.

What is claimed is:

1. A system for visualizing an aircraft procedure including alternative sequences of successive steps, each step comprising at least one operation to be performed, the system comprising:
 a display; and
 a display management assembly configured to display successive steps of the procedure on the display,
 the display management assembly being configured to display, on the display an active step of an active sequence of the procedure, at least one prior step preceding the active step in the active sequence of the procedure and defining one alternative among several series of steps, and at least one subsequent step after the active step in the active sequence of the procedure, without displaying a step of the procedure situated on an inactive sequence of the procedure that may be accessible from any step prior to the active step,
 wherein the display management assembly is configured to display a sequence connection between each pair of successive steps displayed on the display, and, when an alternative exists in the procedure between two successive steps, a branch connection indicating an inactive sequence of the procedure.

2. The system as recited in claim 1 wherein each step of the procedure is chosen from among an operation to be performed, a series of operations to be performed without alternative, an access to a sub-procedure or an alternative among several series of steps.

3. A system for visualizing an aircraft procedure including alternative sequences of successive steps, each step comprising at least one operation to be performed, the system comprising:
 a display; and
 a display management assembly configured to display successive steps of the procedure on the display,
 the display management assembly being configured to display, on the display an active step of an active sequence of the procedure, at least one prior step preceding the active step in the active sequence of the procedure and defining one alternative among several series of steps, and at least one subsequent step after the active step in the active sequence of the procedure, without displaying a step of the procedure situated on an inactive sequence of the procedure that may be accessible from any step prior to the active step,
 wherein the active step is modifiable by a user and/or by an automatic performer of the procedure, the display management assembly being configured, after modification of the active step, to move the former active step onto the display to turn the former active step into a new prior step preceding the new active step in the active sequence of the procedure, to move the former subsequent step after the former active step onto the display to turn the former subsequent step into a new active step and display at least one step after the new active step in the active sequence of the procedure.

4. The system as recited in claim 3 wherein the active step, the subsequent step and the prior step are displayed along an axis on the display, the display management assembly being configured to move the former active step and the former subsequent step along the axis, after modifying the active step.

5. The system as recited in claim 4 wherein the axis is vertical.

6. The system as recited in claim 3 wherein the active step is an alternative between two sequences of steps, the modification of the active step consisting of selecting one step from among the two series of steps, the display management assembly being configured, after modification of the active step, to display an alternative connection between the series of steps, and after modification of the active step, to display at least the chosen step, and to hide the step not chosen.

7. The system as recited in claim 6 wherein the display management assembly is configured to display the chosen step by enlarging the chosen step, and is configured to hide the step not chosen by moving the step not chosen off of the display.

8. The system as recited in claim 3 wherein the modification of the active step is obtained by validating the performance of that step during the performance of the procedure, the display management assembly being configured to display a validation button for the active step, configured to be actuated by a user to validate the active step.

9. The system as recited in claim 8 wherein the validation button is configured to be activated by selecting and moving the button on the display, by the user, along a predetermined trajectory.

10. The system as recited in claim 1 wherein the display management assembly is configured to display a scroll bar configured to be actuated to view, on the display, steps before the active step in the active sequence.

11. The system as recited in claim 10 wherein the scroll bar includes an indicator of the degree of progress of the procedure in the active sequence of the procedure.

12. The system as recited in claim 1 wherein at least one step of the procedure configured to be displayed on the display includes a plurality of operations to be scrolled through with no branch, the display management assembly being configured to display the details of the successive operations to be done in the step.

13. The system as recited in claim 12 wherein the display management assembly is configured to display, during a performance of at least one operation of the procedure, a signal cursor for the operation being carried out, and an indicator showing the performance of each operation to be carried out.

14. The system as recited in claim 1 wherein the display management assembly is configured to display an activation button for the performance of the procedure, that is activatable by the user to go from an activation configuration of the performance of the procedure, preventing consultation of the steps after the procedure, to a paused configuration of the performance of the procedure, allowing the consultation of the subsequent steps of the procedure.

15. A method for visualizing an aircraft procedure including alternative sequences of successive steps, each step comprising at least one operation to be performed, the method comprising:
 providing the viewing system as recited in claim 1; and
 simultaneously displaying, on the display by the display management assembly, an active step of an active sequence of the procedure, at least one prior step before the active step in the active sequence of the procedure, the prior step defining an alternative between several sequences of steps and at least one subsequent step after the active step in this active sequence of the procedure, without displaying a step of the procedure situated on an inactive sequence of the procedure that may be accessible from any step before the active step.

16. The system as recited in claim 3 wherein each step of the procedure is chosen from among an operation to be performed, a series of operations to be performed without alternative, an access to a sub-procedure or an alternative among several series of steps.

17. The system as recited in claim 3 wherein the display management assembly is configured to display a scroll bar configured to be actuated to view, on the display, steps before the active step in the active sequence.

18. The system as recited in claim 17 wherein the scroll bar includes an indicator of the degree of progress of the procedure in the active sequence of the procedure.

19. The system as recited in claim 3 wherein at least one step of the procedure configured to be displayed on the display includes a plurality of operations to be scrolled through with no branch, the display management assembly being configured to display the details of the successive operations to be done in the step.

20. The system as recited in claim 19 wherein the display management assembly is configured to display, during a performance of at least one operation of the procedure, a signal cursor for the operation being carried out, and an indicator showing the performance of each operation to be carried out.

21. The system as recited in claim 3 wherein the display management assembly is configured to display an activation button for the performance of the procedure, that is activatable by the user to go from an activation configuration of the performance of the procedure, preventing consultation of the steps after the procedure, to a paused configuration of the performance of the procedure, allowing the consultation of the subsequent steps of the procedure.

22. A method for visualizing an aircraft procedure including alternative sequences of successive steps, each step comprising at least one operation to be performed, the method comprising:

providing the viewing system as recited in claim 3; and simultaneously displaying, on the display by the display management assembly, an active step of an active sequence of the procedure, at least one prior step before the active step in the active sequence of the procedure, the prior step defining an alternative between several sequences of steps and at least one subsequent step after the active step in this active sequence of the procedure, without displaying a step of the procedure situated on an inactive sequence of the procedure that may be accessible from any step before the active step.

* * * * *